United States Patent
Cherukumudi et al.

(10) Patent No.: US 7,702,900 B1
(45) Date of Patent: Apr. 20, 2010

(54) WEB SERVICES SECURITY TEST FRAMEWORK AND METHOD

(75) Inventors: Vijaykumar Cherukumudi, Overland Park, KS (US); Shrikant D. Jannu, Frisco, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 1247 days.

(21) Appl. No.: 11/231,028

(22) Filed: Sep. 20, 2005

(51) Int. Cl.
*H04L 29/06* (2006.01)
(52) U.S. Cl. .......................................... 713/152; 726/14
(58) Field of Classification Search .................... 726/9, 726/10, 14; 713/152
See application file for complete search history.

(56) References Cited

U.S. PATENT DOCUMENTS

| | | | |
|---|---|---|---|
| 6,611,869 B1 | 8/2003 | Eschelbeck et al. | |
| 6,985,939 B2 * | 1/2006 | Fletcher et al. | 709/223 |
| 7,117,504 B2 * | 10/2006 | Smith et al. | 719/328 |
| 7,219,134 B2 | 5/2007 | Takeshima et al. | |
| 7,418,501 B2 * | 8/2008 | Davis et al. | 709/225 |
| 7,424,608 B1 | 9/2008 | Cherukumudi et al. | |
| 7,434,252 B2 * | 10/2008 | Ballinger et al. | 726/10 |
| 2003/0023880 A1 | 1/2003 | Edwards et al. | |
| 2005/0044197 A1 | 2/2005 | Lai | |
| 2005/0044398 A1 * | 2/2005 | Ballinger et al. | 713/200 |
| 2005/0063333 A1 * | 3/2005 | Patron et al. | 370/329 |
| 2005/0144457 A1 * | 6/2005 | Lee et al. | 713/176 |
| 2005/0182941 A1 | 8/2005 | Della-Libera et al. | |
| 2005/0198154 A1 | 9/2005 | Xie et al. | |

OTHER PUBLICATIONS

Cherukumudi, Vijaykumar, et al., "Web Services Security Architecture," Filing Date—May 10, 2004, U.S. Appl. No. 10/842,400, Specification (27 pgs.) and Drawings (3 sheets).
Cherukumudi, Vijaykumar, et al., "Mechanism for Layered Authentication," Filing Date—Sep. 16, 2004, U.S. Appl. No. 10/943,083, Specification (19 pgs.) and Drawings (2 sheets).
OASIS "Web Services Security: SOAP Message Security 1.0," OASIS Open: Mar. 2004, pp. 1-56, http://docs.oasis-open.org/wss/2004/01/oasis-200401-wss-soap-message-security-1.0.pdf.
IBM and Microsoft, "Security in a Web Services World: A Proposed Architecture and Roadmap," Apr. 7, 2002, pp. 1-25, http://www.erisign.com/wss/architectureRoadmap.pdf.
Microsoft, "Web Security Policy Language," Dec. 18, 2002, pp. 1-19, http://www.verisign.com/wss/WS-SecurityPolicy.pdf.

(Continued)

*Primary Examiner*—Gilberto Barron, Jr.
*Assistant Examiner*—Simon Kanaan

(57) ABSTRACT

A computer-implemented system for managing security using a SOAP message is provided. The system includes a SOAP message that has a security portion. The security portion of the SOAP message has at least one security component. The system includes a custom class and a handler. The custom class identifies the web services security version or draft of the security component within the SOAP message. The handler is operable based on the web services security version or draft related to the at least one security component promote processing of a security aspect of the SOAP message.

18 Claims, 4 Drawing Sheets

OTHER PUBLICATIONS

Office Action dated Jul. 2, 2007 (21 pages), U.S. Appl. No. 10/842,400 filed May 10, 2004.
Office Action dated Dec. 13, 2007 (19 pages), U.S. Appl. No. 10/842,400 filed May 10, 2004.
Final Office Action dated Jun. 30, 2008 (23 pages), U.S. Appl. No. 10/842,400, filed May 10, 2004.
Advisory Action dated Sep. 11, 2008 (3 pages), U.S. Appl. No. 10/842,400, filed May 10, 2004.
Office Action dated Oct. 29, 2008 (21 pages), U.S. Appl. No. 10/842,400, filed May 10, 2004.
Office Action dated Apr. 28, 2009 (5 pages), U.S. Appl. No. 10/842,400, filed May 10, 2004.
Notice of Allowance dated Sep. 4, 2009 (6 pages), U.S. Appl. No. 10/842,400, filed May 10, 2004.

* cited by examiner

WEB SERVICES SECURITY TEST FRAMEWORK AND METHOD

CROSS-REFERENCE TO RELATED APPLICATIONS

This application addresses subject matter related to U.S. patent application Ser. No. 10/842,400, filed May 10, 2004 and entitled "Web Services Security Architecture", which is incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to secure communication between computing systems. More particularly, but not by way of limitation, a system and method for communicating with a web services security system are provided.

BACKGROUND OF THE INVENTION

Simple Object Access Protocol (SOAP) is a protocol for sending messages between computer systems on a network. Messages are placed in an Extensible Markup Language (XML) format and transmitted via the Hypertext Transfer Protocol (http). Since XML and http are commonly available on many computing systems, SOAP offers a convenient means for communication, even among computers operating under different platforms.

A typical SOAP message might consist of a SOAP envelope that is made up of a SOAP header and a SOAP body. The body typically contains the message itself while the header might contain metadata about the message, such as security information. When secure communication is desired between a client and a server on a network, the necessary security information can be included in the SOAP security header.

The Organization for Advancement of Structured Information Standards (OASIS) Web Services Security: SOAP Message Security specification, which is hereby incorporated herein by reference for all purposes, hereinafter referred to as the WSS specification, describes enhancements to SOAP messaging to provide for message security. Among the security profiles supported by the WSS specification are username/password tokens, X.509 certificates, Kerberos tickets, SAML assertions, XrML documents, and XCBF documents, all of which are hereby incorporated herein by reference for all purposes.

SUMMARY OF THE INVENTION

According to one aspect of the present disclosure, a system for managing security using a SOAP message is provided. The system includes a SOAP message that has a security portion. The security portion of the SOAP message has at least one security component. The system includes a custom class and a handler. The custom class identifies the web services security version or draft of the security component within the SOAP message. The handler is operable based on the web services security version or draft related to the at least one security component to promote processing of a security aspect of the SOAP message.

An alternative embodiment provides a system for managing aspects of SOAP message security. The system includes a SOAP message having security information in a security header. The system also includes a generic handler with selectable parameters, the selection of which creates a custom handler operable to insert the security information into the security header of the SOAP message.

In another embodiment, a method for managing aspects of SOAP message security is provided. The method includes creating a SOAP message having security information in a security header portion of the SOAP message. The method provides for providing a generic handler with selectable parameters. The method also includes selecting appropriate parameters to create a custom handler operable to insert the security information into the security header portion of the SOAP message.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

Figure 1:
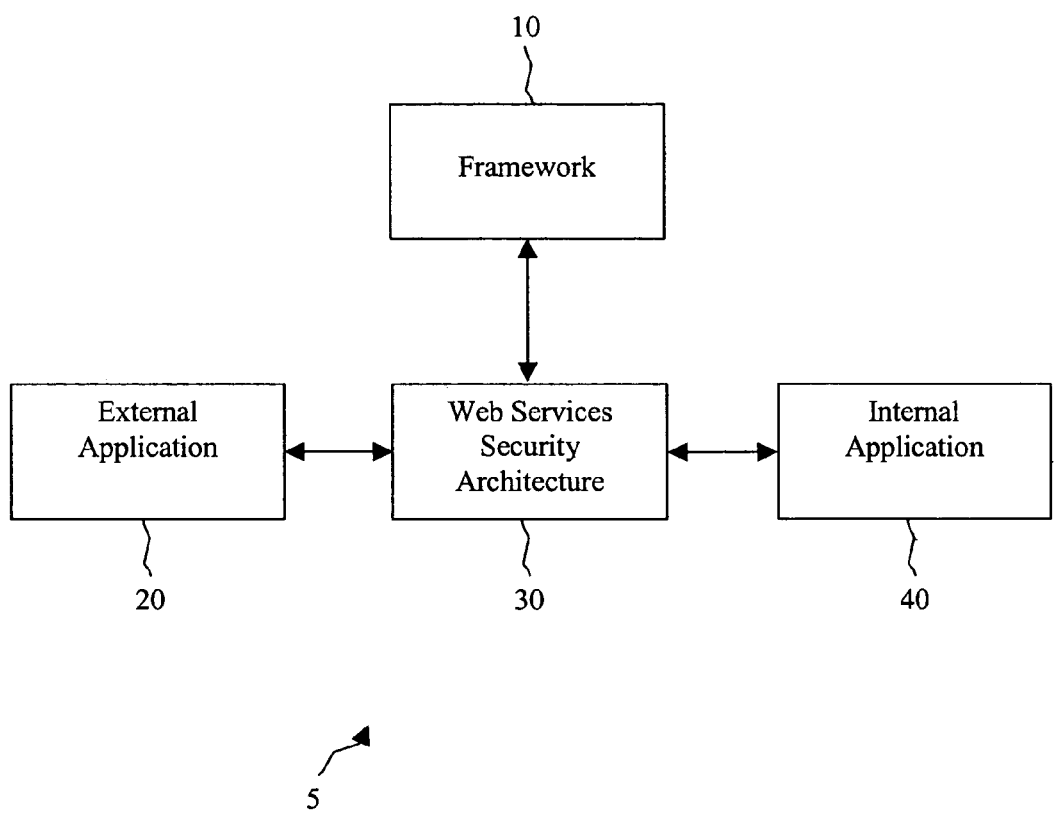
FIG. 1 is a block diagram of a system for sending SOAP messages to a web services security system.

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Prior to describing specific embodiments of the present system, the following provides insight into security techniques with the disclosed systems. Username/password tokens and X.509 certificates are typically well known to those of skill in the art. Kerberos tickets are part of an authentication system in which a Kerberos client contacts an authentication service to obtain a ticket to contact a ticket-granting server. The client then uses a ticket-granting ticket to send a service ticket request to the ticket-granting server. As a response, the ticket-granting server sends a service ticket for the client to interact with the ticket-granting server. The response is encrypted with the ticket-granting ticket.

Security Assertion Markup Language (SAML) defines a protocol by which clients can request security information from SAML authorities and get a response from them. This protocol, consisting of XML-based request and response message formats, can be bound to many different underlying communication and transport protocols. The security information is expressed in the form of assertions about subjects, where a subject is an entity that has an identity in some security domain. Assertions can convey information about authentication acts performed by subjects, attributes of subjects, and authorization decisions about whether subjects are allowed to access certain resources.

Extensible Rights Markup Language (XrML) provides a universal method for securely specifying and managing rights and conditions associated with various resources including digital content and services.

XML Common Biometric Format (XCBF) deals with measurable physical characteristics or personal behavior traits that can be used to recognize the identity of an individual or verify a claimed identity. XCBF defines a common XML markup representation of the patron formats specified in the NIST (National Institute of Standards and Technology) Common Biometric Exchange File Format. A common XCBF security token is defined to convey and manage biometric information used for authentication and identification. Each binary representation of an XCBF message has an XML markup representation and both representations share the same schema. This characteristic allows XML markup to be used in resource-rich environments, but transferred or stored in a compressed binary format in resource-poor environments, such as smart cards, wireless and remote devices, and high volume transaction systems.

Any of the above security profiles as well as other security features can be included in a SOAP security header. For example, XML encryption and/or XML signatures can be applied to the information in the security header. The WSS specification defines how the elements corresponding to the World Wide Web Consortium's XML encryption and XML signature specifications are placed and referenced in the security header.

While there is wide support for the WSS specification in various official versions and draft versions by vendors of third party applications that access web services, the various vendors may support different, incompatible draft and official versions of the specification. To interoperate with multiple vendors, as well as to efficiently adapt to future upgrades and extensions of the WSS specification, a system that can flexibly interoperate with different draft, official, or other versions of the WSS specification is needed. An example of such as system is described in U.S. patent application Ser. No. 10/842,400, filed May 10, 2004 and entitled "Web Services Security Architecture", which is incorporated herein by reference. In this system, a web services security architecture can accept data requests from external applications in multiple formats and with multiple security features. The web services security architecture can then verify that a request is valid, retrieve the requested information from an internal application, and return the requested information to the external application.

It may be necessary for a web services security architecture, such as that described in the above-mentioned patent application, to handle multiple security profiles in the SOAP messages entering and exiting the architecture. Commercial, off-the-shelf products currently exist that can interface with a web services security architecture to handle one particular implementation of a specification for one particular type of security profile. However, such a product might not be able to handle a different implementation of the same specification, an implementation of a different profile, or multiple implementations of multiple profiles.

In various embodiments, a framework and method are provided that allow a web services security architecture to handle various combinations of various implementations of the security profiles described in the WSS specification. In addition, the framework can apply XML encryption and XML signatures to the profiles. The use of a single framework for all communication with the web services security architecture provides consistency in the messaging procedures as well as allowing the easy addition or deletion of security profiles from SOAP messages.

FIG. 1 illustrates a computing system 5 that uses an embodiment of a messaging framework 10. When an application 20 external to an enterprise wishes to communicate with an application 40 internal to the enterprise, the enterprise might require that the communication pass through a web services security architecture 30. The web services security architecture 30 can examine the security information contained in the message sent from the external application 20 and determine whether the external application 20 is authorized to gain access to the internal application 40.

According to one embodiment, the framework 10 can send SOAP messages to the web services security architecture 30 to ensure that the web services security architecture 30 can handle the security profiles described in the WSS specification. Each profile, such as username/password tokens, X.509 certificates, Kerberos tickets, SAML assertions, XrML documents, and XCBF documents, might have a different data format and might be inserted in a different location in the security header of a SOAP message. In addition, there may be differences among the implementations of the profiles produced by different vendors. There might also be differences between the draft and final versions of a WSS specification.

The framework 10 uses a handler-based approach to send SOAP messages containing various combinations of implementations of the profiles. The framework 10 uses a generic handler that contains a set of customizable classes, each of which can be used to designate various implementations and versions of the WSS specification security profiles. When the framework 10 sends a SOAP message to the web services security architecture 30, the framework 10 can use the appropriate classes to insert any or all of the implementations and versions of the security profiles into the appropriate locations in the security header of the SOAP message, as specified by the WSS specification. The framework 10 can also apply XML encryption and/or an XML signature to the SOAP message.

The generic handler can take the form of a chain of classes containing parameters that can be selected or deselected to create a custom handler that specifies the versions, implementations, and profiles that apply to a SOAP message. The following sample code illustrates the form that the generic handler might take. This code is provided as an example only and it should be understood that other coding techniques, other syntax, and other programming languages could be used.

swss.id
 swss.soap_req,
 swss.spec_level (wss-draft12, wss1.0),
 swss.token_type (user_name, x509cert),
 swss.provider_impl ( ).

The swss.spec_level class specifies the version of the WSS specification that will be used in a SOAP message. In this example, the parameters for the version include a draft version, wss-draft12, and a final version, wss1.0. In other embodiments, other versions might be present. A user can select which version or versions are to be applied to a message by including the desired versions in the swss.spec_level class and deleting any undesired versions.

The swss.token_type class specifies the security profile that will be used in a SOAP message. In this example, the profile parameters are user_name and x509cert, referring to a username/password token and an X.509 certificate, respectively. In other embodiments, Kerberos tickets, SAML assertions, XrML documents, XCBF documents, and other profiles might be present. A user can select which profile or profiles are to be applied to a message by including the desired profiles in the swss.token_type class and deleting any undesired profiles.

The swss.provider_impl class specifies which vendor implementation of a security profile will be used in a SOAP message. While no vendor implementation parameters are shown in this example, in a typical situation a list of parameters designating the available implementations would be present. A user can select which implementation or implementations are to be applied to a message by including the desired implementations in the swss.provider_impl class and deleting any undesired implementations.

The selection of various parameters in the generic handler creates various custom handlers. The generic handler and the custom handlers comprise a reusable, extensible framework 10 that can easily be adapted to send SOAP messages with any desired security profiles, versions, and implementations. For example, if a SOAP message is to be sent under a new implementation of a security profile, a simple change can be made to the configuration of an existing custom handler to accommodate the new implementation. If other security features in addition to specification level, token type, and provider implementation are needed, classes for the additional features can simply be added to the existing chain of classes.

As an example of how the framework 10 might send SOAP messages to the web services security architecture 30, a SOAP message containing a security header formatted according to a single implementation of a single version of a single security profile might be sent from the framework 10 to the web services security architecture 30. If the web services security architecture 30 is able to properly process the security information in the SOAP message, an additional security profile might be added to the SOAP message and the SOAP message might again be sent from the framework 10 to the web services security architecture 30. If the web services security architecture 30 can again process the SOAP message, further information can be added to the security header.

This procedure of adding information to the security header and submitting the SOAP message can continue until SOAP messages with all possible combinations of versions, implementations, profiles, and any other desired features have been sent. XML encryption can be performed on the various combinations and XML signatures can be added to the various combinations. If the web services security architecture 30 handles all the combinations properly, it can be assumed that there will be no interoperability issues among the different security profiles when SOAP messages are sent from the framework 10 to the web services security architecture 30.

While the discussion has focused on the sending of messages from the framework 10 to the web services security architecture 30, it should be understood that similar considerations would apply to the sending of messages to the framework 10 from the web services security architecture 30. That is, the framework 10 can recognize the security information in a SOAP message sent by the web services security architecture 30 and can interpret the security information in an appropriate manner.

The framework 10 can be distributed to external entities for use when external applications 20 communicate with the web services security architecture 30. That is, when an external application 20 sends a SOAP message to the web services security architecture 30, the message can pass through a handler that sets the security parameters for the message. A similar handler may be present on the front end of the web services security architecture 30 to receive the message and interpret the configuration of the parameters set by the first handler.

Figure 2:
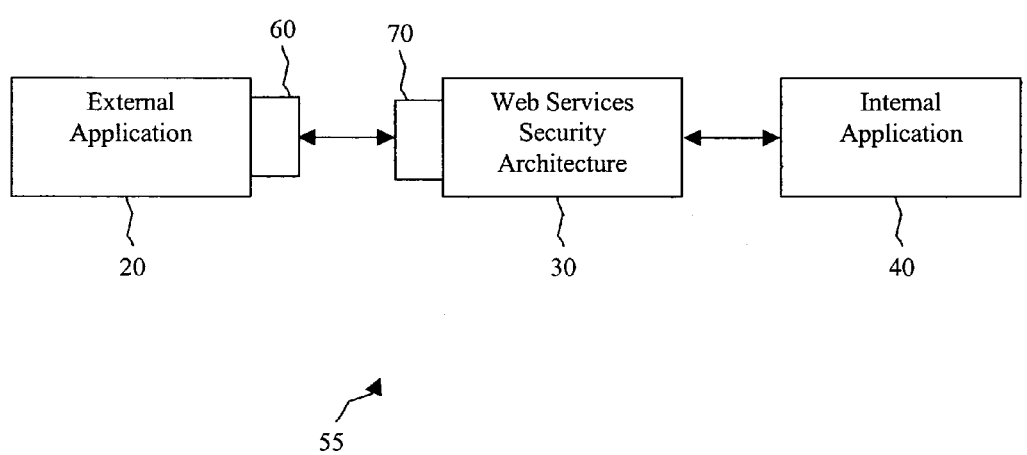
FIG. 2 is a block diagram of an alternative system for sending SOAP messages to a web services security system.

A system 55 using this arrangement of handlers is illustrated in FIG. 2. A first handler 60 is coupled to an external application 20 and a second handler 70 is coupled to the web services security architecture 30. When the external application 20 sends a SOAP message to the web services security architecture 30, the first handler 60 intercepts the message and applies the appropriate settings to the security header. For example, the first handler 60 might specify that the message will use a username/password token and an X.509 certificate, will follow a particular vendor's implementation of Web Services Security version 1.0, and will be encrypted and signed. The first handler 60 then passes the message on to the web services security architecture 30.

The second handler 70 intercepts the message and determines that the message needs to be decrypted and that the signature needs to be verified. The second handler 70 then reads the security settings configured by the first handler 60 and determines the security profile and other security features that apply to the message. The second handler 70 then passes the message on to the web services security architecture 30 using the specified security features. The web services security architecture 30 then determines whether the external application 20 is allowed access to the internal application 40.

In an embodiment, the framework 10 is also able to do performance testing on the message-handling capabilities of the web services security architecture 30. That is, an additional class can be added to the generic handler that allows performance testing parameters to be selected. The performance testing parameters might include the number of messages to be sent, the period of time over which the messages are to be sent, and the interval between each message. Different performance testing parameters can be selected for different profiles, versions, and implementations. When messages with performance testing parameters are sent between the framework 10 and the web services security architecture 30, the framework 10 can observe and analyze how well the web services security architecture 30 handles the messages.

Figure 3:
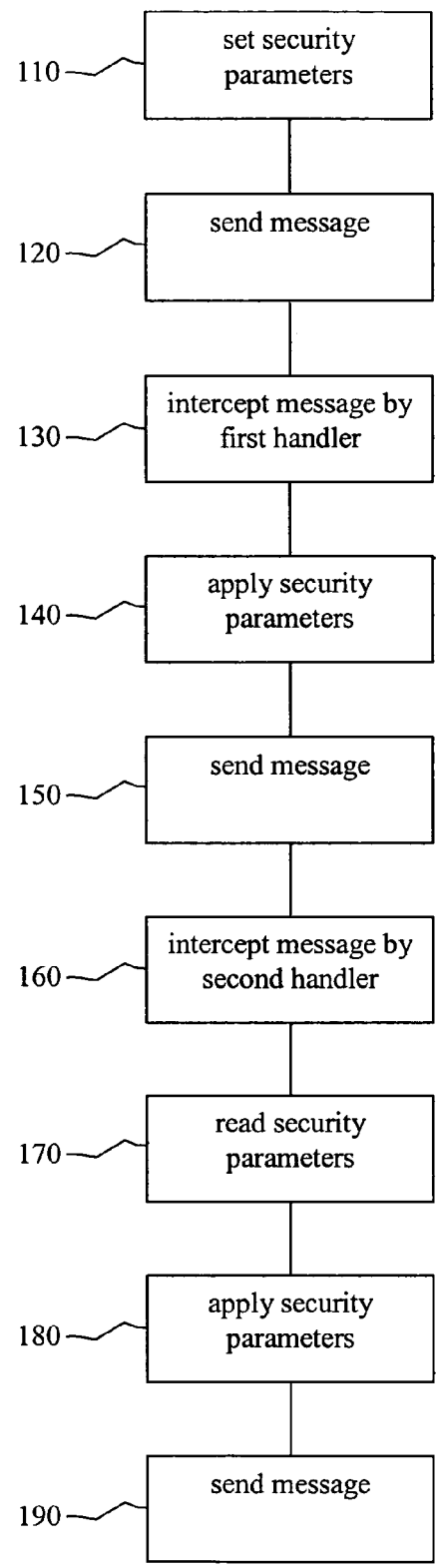
FIG. 3 is a flow chart of a method for sending SOAP messages to a web services security system.

FIG. 3 illustrates a method for using a handler-based approach to apply security information to a SOAP message. In box 110, the security parameters that apply to the message, such as the profile, version, and implementation, are selected. In box 120, the message is sent from an external application to a web services security architecture. In box 130, the message is intercepted by a first handler. The first handler applies the selected security parameters to the message in box 140. In box 150, the first handler sends the message to the web services security architecture. In box 160, the message is intercepted by a second handler. In box 170, the second handler reads the security parameters, and the second handler applies the security parameters in box 180. In box 190, the second handler sends the message to the web services security architecture.

Figure 4:
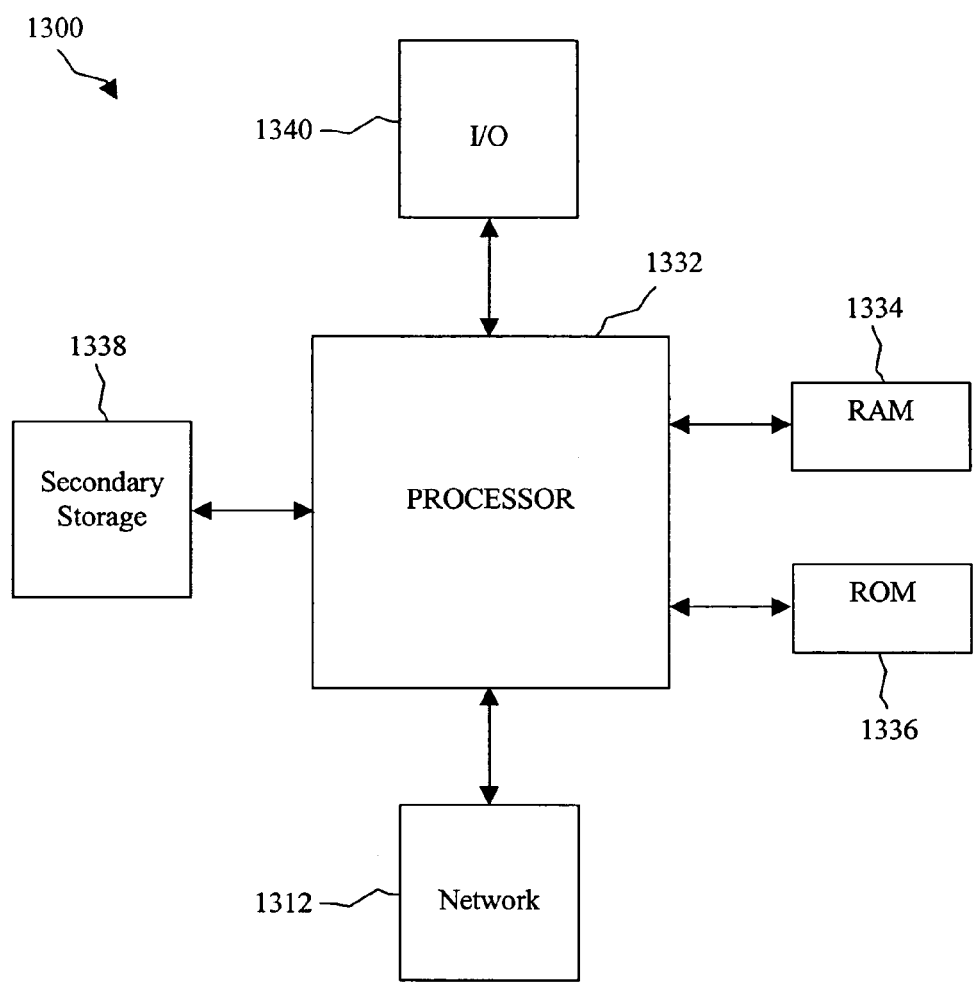
FIG. 4 illustrates an exemplary general-purpose computer system suitable for implementing the several embodiments of the disclosure.

The system described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 1300 includes a processor 1332 (which may be referred to as a central processor unit or CPU) that is in communication with memory devices including secondary storage 1338, read only memory (ROM) 1336, random access memory (RAM) 1334, input/output (I/O) devices 1340, and network connectivity devices 1312. The processor 1332 may be implemented as one or more CPU chips.

The secondary storage 1338 is typically comprised of one or more disk drives or tape drives and is used for non-volatile storage of data and as an over-flow data storage device if RAM 1334 is not large enough to hold all working data. Secondary storage 1338 may be used to store programs that are loaded into RAM 1334 when such programs are selected for execution. The ROM 1336 is used to store instructions and perhaps data that are read during program execution. ROM 1336 is a non-volatile memory device that typically has a small memory capacity relative to the larger memory capacity of secondary storage. The RAM 1334 is used to store volatile data and perhaps to store instructions. Access to both ROM 1336 and RAM 1334 is typically faster than to secondary storage 1338.

I/O devices 1340 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1312 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1312 may enable the processor 1332 to communicate with the Internet or one or more intranets. With such a network connection, it is contemplated that the processor 1332 might receive information from a network or might output information to a network in the course of performing the above-described method steps.

Such information, which may include data or instructions to be executed using processor 1332 for example, may be received from and outputted to the network, for example, in the form of a computer data baseband signal or signal embodied in a carrier wave. The baseband signal or signal embodied in the carrier wave generated by the network connectivity devices 1312 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1332 executes instructions, codes, computer programs, or scripts that it accesses from hard disk, floppy disk, optical disk (these various disk-based systems may all be considered secondary storage 1338), ROM 1336, RAM 1334, or the network connectivity devices 1312.

While several embodiments have been provided in the present disclosure, it should be understood that the disclosed systems and methods may be embodied in many other specific forms without departing from the spirit or scope of the present disclosure.

The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A computer-implemented system for managing security using a soap message; comprising:
   a handler stored on a computer readable storage medium and executable by a processor, the handler comprising a set of customizable classes containing selectable parameters that specify one of a web services security version and a web services security draft related to at least one security component, the handler is distributed to an external entity to promote communication with a web services security architecture; and
   a plurality of custom handlers, each of the plurality of custom handlers created by selection of a different group of at least some of the selectable parameters of the set of customizable classes of the handler, each of the plurality of custom handlers stored on a computer readable storage medium and executable by a processor to insert the at least one security component into a security portion of a corresponding SOAP message based on the specified one of the web services security version and the web services security draft related to the at least one security component, wherein each of the plurality of custom handlers is created to determine whether the web services security architecture can properly process the at least one security component in the corresponding SOAP message, and wherein a first one of the plurality of custom handlers is executable to insert the at least one security component into a first security portion of a first SOAP message such that the web services security architecture properly processes the at least one security component in the first SOAP message.

2. The computer-implemented system of claim 1, wherein the at least one security component is selected from a group of security components consisting of a username/password token, an X.509 certificate, a Kerberos ticket, an SAML assertion, an XrML document, and an XCBF document.

3. The computer-implemented system of claim 1, wherein the at least one security component includes each of a username/password token, an X.509 certificate, a Kerberos ticket, an SAML assertion, an XrML document, and an XCBF document.

4. The computer-implemented system of claim 1, wherein the at least one security component includes a plurality of security components selected from a group of security components consisting of a username/password token, an X.509 certificate, a Kerberos ticket, an SAML assertion, an XrML document, and an XCBF document.

5. A computer-implemented system for managing aspects of SOAP message security, comprising:
   a generic handler with selectable parameters stored on a computer readable storage medium and executable by a processor, wherein the generic handler is distributed to an external entity to promote communication with a web services security architecture, and wherein the selectable parameters include a first set of selectable parameters that specify at least one web services security specification and a second set of selectable parameters that specify at least one security profile;
   a custom handler created by selection of the selectable parameters of the generic handler, the custom handler stored on a computer readable storage medium and executable by a processor to insert the at least one security profile into a security header of a SOAP message based on the at least one web services security specification; and a second custom handler created by selection of at least one additional security profile of the generic handler upon a determination that the web services security architecture properly processes the at least one security profile in the SOAP message, the second custom handler stored on a computer readable storage medium and executable by a processor to insert the at least one security profile and the at least one additional security profile into a second security header of a second SOAP message based on the at least one web services security version.

6. The computer-implemented system of claim 5, wherein the security header comprises a designation of a security profile based on one of a designation of a web services security specification version and a designation of a vendor implementation of the web services security specification.

7. The computer-implemented system of claim 5, wherein the at least one security profile is selected from a group of security profiles comprising:
a username/password token;
an X.509 certificate;
a Kerberos ticket;
an SAML assertion;
an XrML document; and
an XCBF document.

8. The computer-implemented system of claim 7, wherein encryption is performed on the SOAP message.

9. The computer-implemented system of claim 7, wherein a digital signature is added to the SOAP message.

10. The computer-implemented system of claim 5, wherein the generic handler carries out performance testing.

11. A computer-implemented method for managing aspects of SOAP message security comprising:
distributing a framework stored on a computer readable storage medium and executable by a processor to an external entity to promote communication with a web services security architecture, the framework including a generic handler with selectable parameters, the selectable parameters including a first set of selectable parameters that specify at least one web services security specification and a second set of selectable parameters that specify at least one security profile; and
receiving selection of at least one of the first set of selectable parameters and at least one of the second set of selectable parameters of the generic handler;
creating a custom handler responsive to the selection that inserts the at least one of the second set of selectable parameters into a security header of a SOAP message as specified by the at least one of the first set of selectable parameters;
sending, by the framework, the SOAP message to the web services security architecture;
determining, by the framework, whether the web services security architecture properly processes the at least one of the second set of selectable parameters inserted in the security header of the SOAP message as specified by the at least one of the first set of selectable parameters;
receiving selection of an additional one of the second set of selectable parameters of the generic handler responsive to the framework determining that the web services security architecture properly processes the at least one of the second set of selectable parameters inserted in the security header of the SOAP message as specified by the at least one of the first set of selectable parameters;
creating a second custom handler responsive to receiving selection of the additional one of the second set of selectable parameters that inserts the additional one of the second set of selectable parameters and the at least one of the second set of selectable parameters into a second security header of a second SOAP message as specified by the at least one of the first set of selectable parameters.

12. The computer-implemented method of claim 11, wherein the security header comprises a designation of a security profile based on one of a designation of a web services security specification version and a designation of a vendor implementation of the web services security specification.

13. The computer-implemented system of claim 11, wherein the at least one security profile includes each of a username/password token component, an X.509 certificate component, a Kerberos ticket component, an SAML assertion component, an XrML document component, and an XCBF document component.

14. The computer-implemented system of claim 11, wherein the at least one security profile is further defined as including a plurality of security profiles, the plurality of security profiles selected from a group of security profiles consisting of a username/password token, an X.509 certificate, a Kerberos ticket, an SAML assertion, an XrML document, and an XCBF document.

15. The computer-implemented method of claim 11, further comprising encrypting and digitally signing the SOAP message.

16. The computer-implemented method of claim 11, further comprising configuring the generic handler to carry out performance testing.

17. The computer-implemented method of claim 11, wherein the at least one security profile is selected from a group of security profiles consisting of a ticket, a token, an assertion, a document.

18. The computer-implemented system of claim 1, further comprising:
a second one of the plurality of custom handlers created by selection of at least one additional security component of the handler upon a determination that the web services security architecture properly processes the at least one security component in the security portion of the first SOAP message from the first one of the plurality of custom handlers, the second one of the plurality of custom handlers stored on a computer readable storage medium and executable by a processor to insert the at least one security component and the at least one additional security component into a second security portion of a second SOAP message based on the specified one of the web services security version and the web services security draft related to the at least one security component.

* * * * *